United States Patent
Siebenthaler (10) Patent No.: US 11,650,829 B2
(45) Date of Patent: *May 16, 2023

(54) NETWORK SWITCH RECOVERY AFTER REBOOT

(71) Applicant: Amazon Technologies, Inc., Seattle, WA (US)

(72) Inventor: John K. Siebenthaler, Austin, TX (US)

(73) Assignee: Amazon Technologies, Inc., Seattle, WA (US)

(*) Notice: Subject to any disclaimer, the term of this patent is extended or adjusted under 35 U.S.C. 154(b) by 586 days.

This patent is subject to a terminal disclaimer.

(21) Appl. No.: 16/041,527

(22) Filed: Jul. 20, 2018

(65) Prior Publication Data

US 2018/0329719 A1   Nov. 15, 2018

Related U.S. Application Data

(63) Continuation of application No. 14/834,126, filed on Aug. 24, 2015, now Pat. No. 10,031,763.

(51) Int. Cl.
| | |
|---|---|
| *G06F 9/4401* | (2018.01) |
| *G06F 13/40* | (2006.01) |
| *H04L 41/082* | (2022.01) |
| *H04L 41/0853* | (2022.01) |
| *G06F 9/445* | (2018.01) |
| *H04L 41/0654* | (2022.01) |

(52) U.S. Cl.
CPC ........ *G06F 9/4416* (2013.01); *G06F 13/4022* (2013.01); *H04L 41/082* (2013.01); *H04L 41/0853* (2013.01); *G06F 9/4401* (2013.01); *G06F 9/44505* (2013.01); *H04L 41/0672* (2013.01); *H04L 41/0856* (2013.01)

(58) Field of Classification Search
None
See application file for complete search history.

(56) References Cited

U.S. PATENT DOCUMENTS

| | | |
|---|---|---|
| 7,515,600 B1 | 4/2009 | Savage et al. |
| 7,761,613 B2 | 7/2010 | Chen et al. |
| 9,059,919 B1 | 6/2015 | Sobel |
| 2005/0055598 A1 | 3/2005 | Chen et al. |
| 2006/0018333 A1 | 1/2006 | Windisch et al. |
| 2006/0106891 A1* | 5/2006 | Mahar ............... G06F 16/10 707/999.203 |
| 2006/0200672 A1 | 9/2006 | Calhoon et al. |
| 2007/0220372 A1 | 9/2007 | Chen |
| 2008/0235450 A1 | 9/2008 | Han et al. |
| 2016/0294566 A1 | 10/2016 | Pan |

* cited by examiner

*Primary Examiner* — Paul Yen
(74) *Attorney, Agent, or Firm* — Klarquist Sparkman, LLP (57) ABSTRACT

A network switch can be configured using a boot loader after a reset of a controller within the network switch. The boot loader configures switching logic within the network switch prior to an operating system becoming operational. By allowing the boot loader to configure the switching logic, the network switch can become operational as fast as possible.

17 Claims, 7 Drawing Sheets

NETWORK SWITCH RECOVERY AFTER REBOOT

CROSS-REFERENCE TO RELATED APPLICATION

This is a continuation of U.S. patent application Ser. No. 14/834,126, filed Aug. 24, 2015 (now U.S. Pat. No. 10,031,763), which application is incorporated herein by reference in its entirety.

BACKGROUND

Traffic on the Internet has quickly grown and continues to expand at unprecedented rates. Network switches play a critical role in sustaining that growth. Data to be passed by switches is generally divided into a series of packets that can be transmitted between devices. Packets include control information and payload data. The control information includes information used to deliver the payload data. For example, control information can include source and destination network addresses, error detection codes, packet sequencing identification, and the like. Typically, control information is found in packet headers and trailers included within the packet and adjacent to the payload data.

Generally, network switches have two primary planes: a control plane and a data plane. The control plane is a management plane that configures the data plane. The data plane receives packets on input ports and transmits the received packets to output ports based on the configuration. Communication between the control plane and data plane can be accomplished through a communications bus (e.g., PCIe).

The control plane can be rebooted for a number of reasons. For example, power loss may occur, or a processor can crash can occur, or the control plane can be intentionally rebooted, such as when a software update occurs. Any of these events can cause the entire switch to be offline for an extended period as the control plane operating system needs to go through a boot operation before the switch can become operational again.

Faster techniques are needed to allow the network switch to become operational after a reboot of the network switch.

DETAILED DESCRIPTION

In a network switch, a CPU can reboot (reset) for a number of reasons. For example, the CPU can crash (e.g., have a programming failure). Typically, in such a situation, the CPU fails to write to a watchdog register within a timeout period, which causes a hardware reset of the CPU by the watchdog timer. Alternatively, there can be a soft reboot (i.e., an intentional reboot), such as after a software update. Still further, the network switch can go through a power cycle wherein it losses power for a brief period.

When an unintentional reboot occurs, the CPU may have been in the process of configuring a data plane and been interrupted. The configuration data can be stored in memory (e.g., DRAM or Flash memory) on the switch and the CPU can continue with the configuration after the reboot.

To prevent other network devices that are running distributed routing protocols from concluding that the switch is completely offline, a boot loader (also called a bootstrap loader) in the network switch can 'push' the configuration into the data plane to complete the configuration that was interrupted. The boot loader can perform such a configuration before an operating system has been booted. Because the boot loader starts before the operating system boot begins, the configuration can be validated within the boot loader. This allows the switch to continue forwarding packets as before the crash. Even though the routing protocols are not running until the operating system boots up (i.e., the operating system starts up and proceeds through an initialization so that it becomes operational), the switch continues in the same state it was in before the crash or reset. The boot loader controlled configuration of the data plane can be extended to any power up of the CPU, such as an intentional reboot.

The CPU can use a journaling system and maintain a journal file in the DRAM or in Flash memory that is used to repair any inconsistencies that occur due to improper shut down. The CPU can store metadata in the journal indicating a state it was in while pushing the configuration to the data plane. Once a configuration update is complete, the state can be updated in the journal indicating that the configuration update is complete. Likewise, if configuration is not complete, the boot loader can retrieve the configuration state and configuration data and push the configuration data to the data plane to allow the data plane to become operational.

Figure 1:
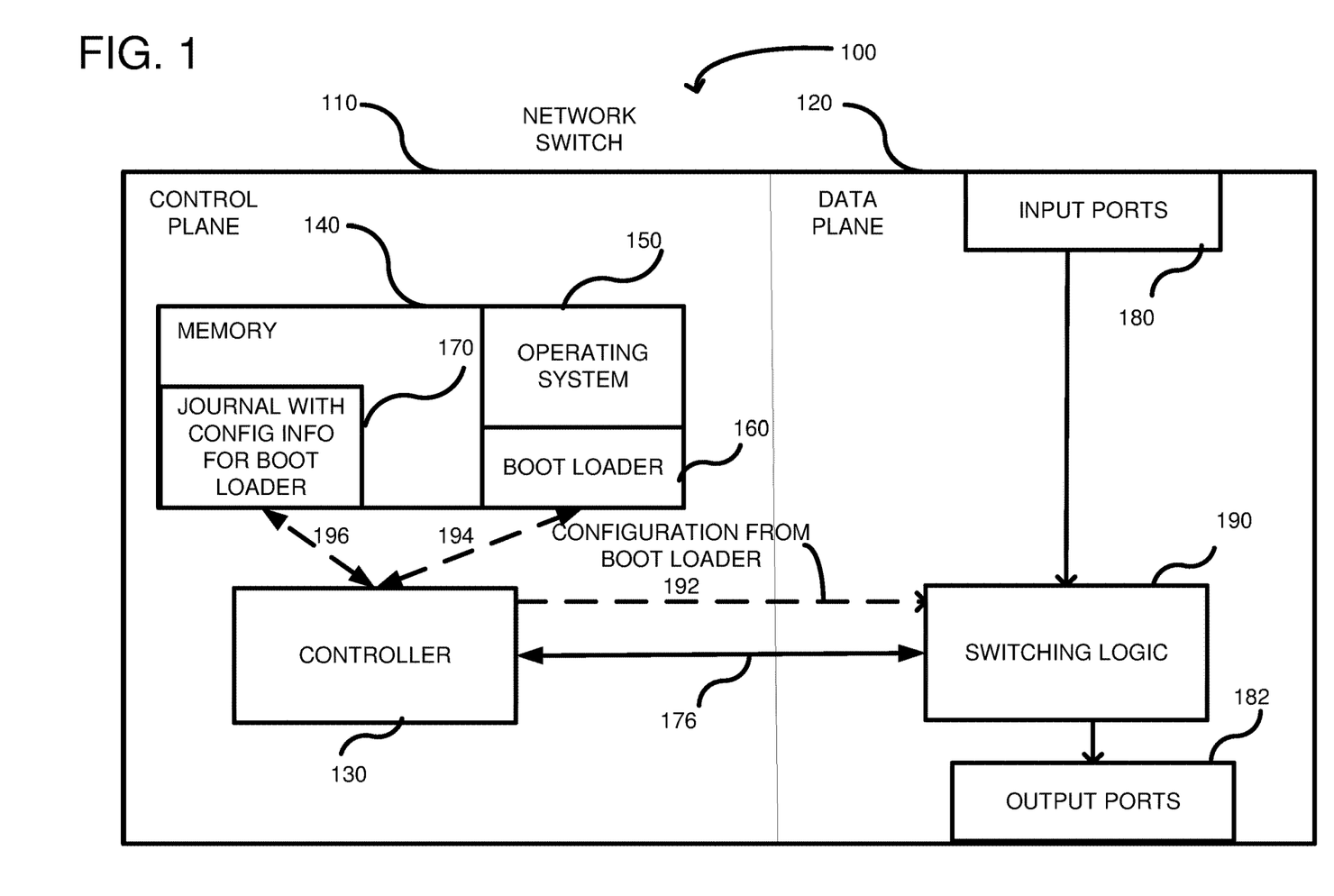
FIG. 1 is an embodiment of a network switch, wherein a data plane is configured using a boot loader.

FIG. 1 is a first embodiment of a network switch 100 that can recover quickly from a hardware or software initiated reboot. The network switch 100 includes a control plane 110 and a data plane 120. The control plane 110 is generally a management layer for configuring, updating, and controlling the data plane 120. The control plane includes a controller 130, which can be a Central Processing Unit (CPU), processor, microcontroller, or any hardware logic that can execute a boot loader program. The controller 130 has access to a memory 140 that can be a Dynamic Random Access Memory (DRAM), Flash memory, or other type of RAM or ROM. The memory 140 is used to store an operating system 150 and a boot loader 160. The boot loader 160 is a first program executed after a reboot of the controller 140 and can run basic hardware tests before booting up the operating system 150 (booting up or to boot up means to initialize software associated with a module or component and bring it to an operational state). The memory 140 can also include a journal 170 that can be used to store state information related to configuration of the data plane 120. Although a single memory is shown, the memory 140 can be divided into multiple memories and even memories of different types. For example, the boot loader 160 can be stored in a ROM, while the journal 170 can be stored in a RAM. A communications bus 176 allows communications between the controller 130 and the data plane 120. The communications bus 176 can be any desired bus type, such as PCI, PCIe, AGP, etc. The data plane 120 includes input port 180 and output port 182 used for receiving and sending network packets, respectively. Switching logic 190 is positioned intermediate the input and output ports. The switching logic 190 includes hardware for switching in accordance with layer 2, layer 3 or both.

As explained more fully below, after a reboot of the control plane 110, and, in particular, a reboot of the controller 130, the controller executes the boot loader 160 by retrieving it from the memory 140. Using the boot loader 160, the controller 130 can establish communications over the bus 176 so that the hardware bus becomes operational. Additionally, the controller 130 can retrieve configuration information from the journal 170. The configuration information can include configuration data itself and state information indicating a state of any configuration updates, such as whether the updates are completed or not completed. As such, the journal 170 allows the boot loader program to determine a state of any configuration updates and then to continue with the configuration updates over the bus 176, as indicated at 192. Thus, the boot loader 160 configures the switching logic 190 prior to the operating system being booted. As such, the switching logic 190 can become operational sooner than previous designs. Once operational, the switching logic 190 can begin transmitting packets from the input port 180 to the output port 182 before the operating system 150 for the network switch 100 is operational. The boot loader 160 can then continue with loading the operating system 150 to allow the network switch to become fully operational including using routing protocols. Other components (not shown) attached to the network switch 100 will see that the network switch is operational even before the operating system 150 is loaded. Over all, the network switch 100 recovers quicker than prior switches due to the ability to configure the switching logic 190 from the boot loader 160.

Figure 2:
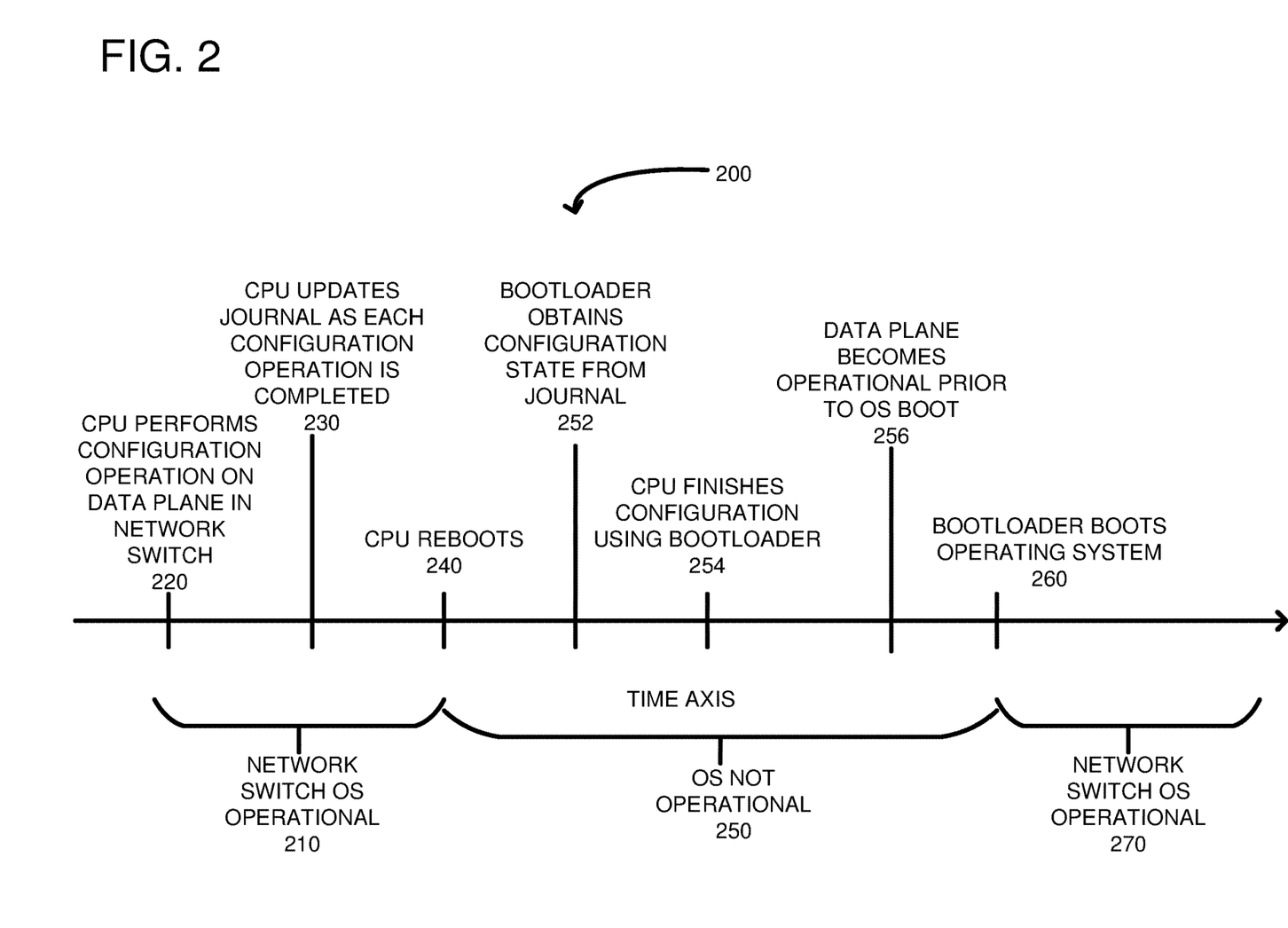
FIG. 2 is an example timeline showing a CPU reboot with a data plane becoming operational prior to an operating system boot.

FIG. 2 shows a timeline 200 of a reboot of a CPU in a network switch according to one embodiment. Any controller type can be used in place of the CPU in this example. During a first period of time 210, the network switch operating system is operational and the network switch is fully functional. Indeed, at the start of this timeline, the network switch may have been operational for an extended period of time, such as weeks or months. In any event, at time 220, the CPU performs a configuration operation on the data plane as an update. From time to time, updates to routing information can occur and the switching logic is programmatically updated by the CPU. As the CPU performs the configuration updates, a journal can be updated in memory to show the status of the updates, as shown at 230. Tracking of updates in a journal can be accomplished in a variety of manners and is a matter of design choice. In one example, a flag can be set indicating that a configuration update has started and the flag is cleared when the configuration update is finished. At any time while the configuration updates are continuing, the CPU can be rebooted, as shown at 240, through either a software or hardware reboot. Such a rebooting can be planned (e.g., soft update due to software upgrade) or unplanned, such as is the case when a power loss occurs. At this point, the operating system becomes not operational as indicated at 250. Additionally, the switching logic can also become not operational. At 252, the boot loader obtains configuration state from the journal and finishes the configuration (254). The data plane then becomes operational as shown at 256. Thus, the boot loader completes the configuration of the data plane and ensures that it becomes operational before the operating system loads. At 260, the boot loader boots the operating system so that it can resume operation, as shown at 270.

Figure 3:
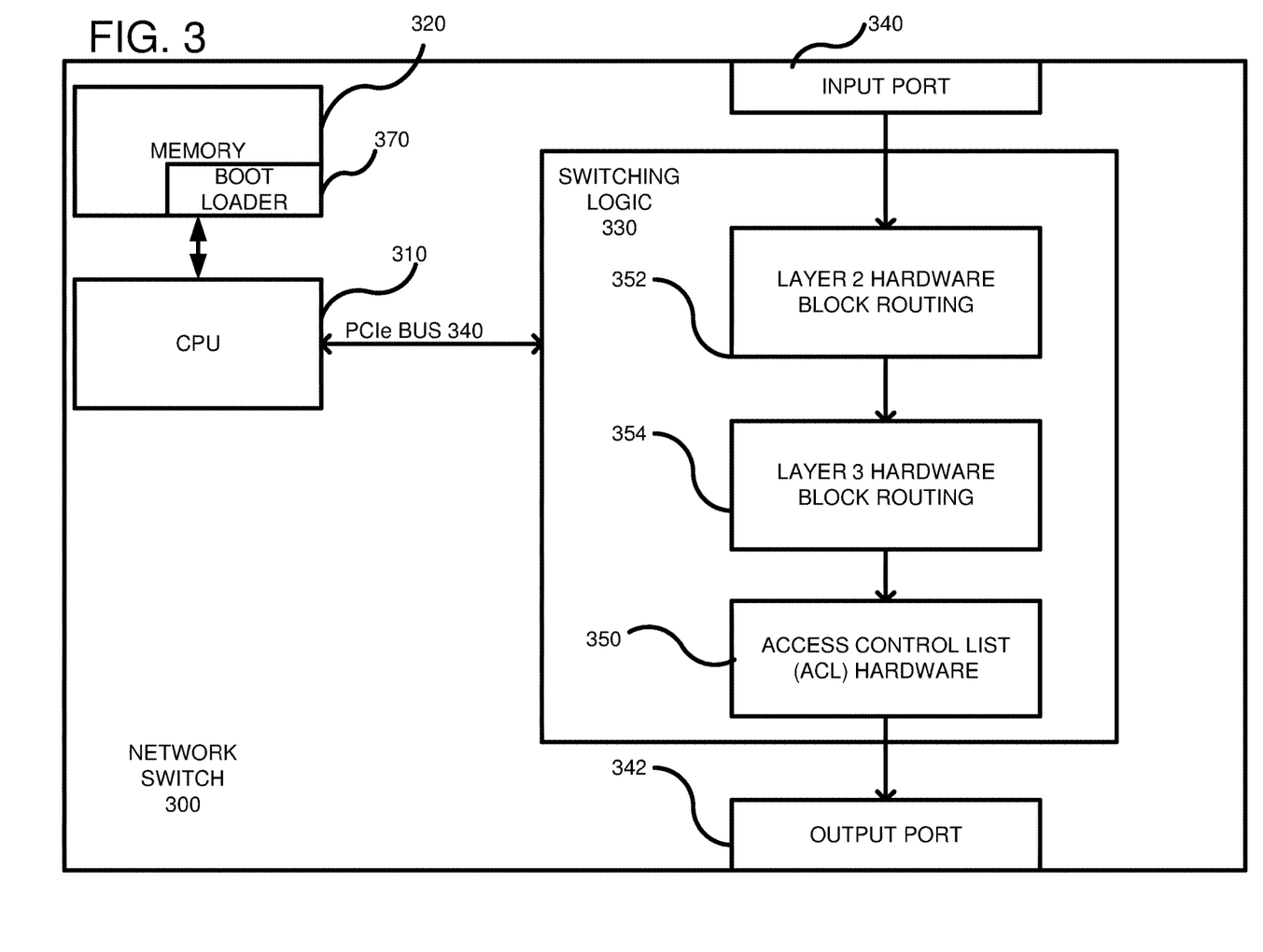
FIG. 3 shows further details of an embodiment of a network switch including layer 2 and layer 3 switching hardware.

FIG. 3 shows a detailed example of an embodiment of a network switch 300. In this embodiment, a CPU 310 is coupled to a memory 320 and to switching logic 330 through a PCIe bus 340 (other protocols and bus types can be used). The switching logic 330 is positioned between an input port 340 and an output port 342, which are typically adapted to receive network cables, such as Ethernet cables. The switching logic 330 can be a single ASIC integrated circuit or divided into multiple integrated circuits. The switching logic 330 can include multiple different hardware logic blocks including a Layer 2 hardware block 352, a Layer 3 hardware block 354, and an Access Control List (ACL) hardware block 350. The layer 2 hardware block 352 relates to an Ethernet layer and can forward packets based on MAC tables. The layer 3 hardware block 354 relates to forwarding based on a longest prefix match of an IP address. The ACL block 350 relates to permissions and can include rules whether to drop packets. The different hardware blocks can be in a pipeline and additional hardware blocks can be added based on the design.

The CPU can use a boot loader 370 stored in the memory 320 to configure any of the hardware blocks 350, 352, 354 upon startup of the CPU, such as by powering on, resetting, or otherwise. The boot loader 370 can be designed to configure any of these hardware logic blocks by programming registers, memory locations, or other hardware within the blocks. The programming can include programming of the logic to control packet routing, such as MAC tables associated with the layer 2 hardware logic block, security rules associated with the ACL logic, etc. Packets then pass from the input port 340 to the output port in accordance with the configuration of the hardware logic blocks 350, 352, 354 in the pipeline.

Figure 4:
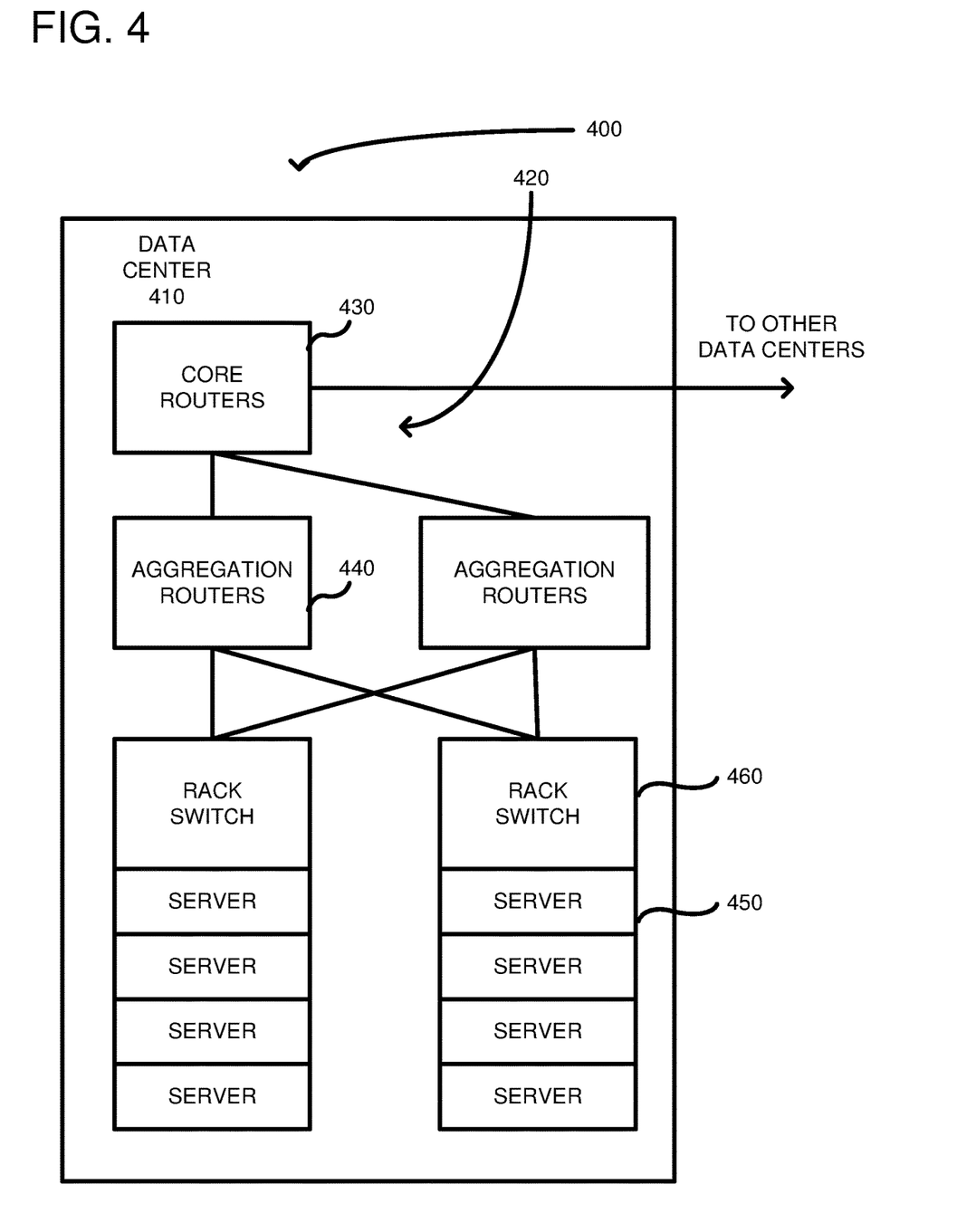
FIG. 4 shows an example environment in which the network switch can be used.

FIG. 4 illustrates an environment 400 in which the network of routers and switches can be used. In this example, the environment 400 includes a plurality of data centers including data center 410 coupled together by routers, shown generally at 420. Different levels of routers can be used. For example, core routers 430 can be coupled to other core routers in other data centers within a service provider environment. The routers 430 read address information in a received packet and determine the packet's destination. If the router decides that a different data center contains a host server computer, then the packet is forwarded to that data center. If the packet is addressed to a host in the data center 410, then it is passed to a network address translator (NAT) (not shown) that converts the packet's public IP address to a private IP address. The NAT also translates private addresses to public addresses that are bound outside of the datacenter 410. Additional aggregation routers 440 can be coupled to the NAT to route packets to one or more racks of host server computers 450. Each rack 450 can include a switch 460 coupled to the multiple host server computers. Although one core router 430 and two aggregation routers 440 are shown, in a real data center there can be many more routers and the routers can be grouped into areas as described herein. Additionally, any number of rack switches can be used. The embodiments described herein are generally used in the rack switches 460. However, the boot loader configuration can be extended to other switches, such as routers.

Figure 5:
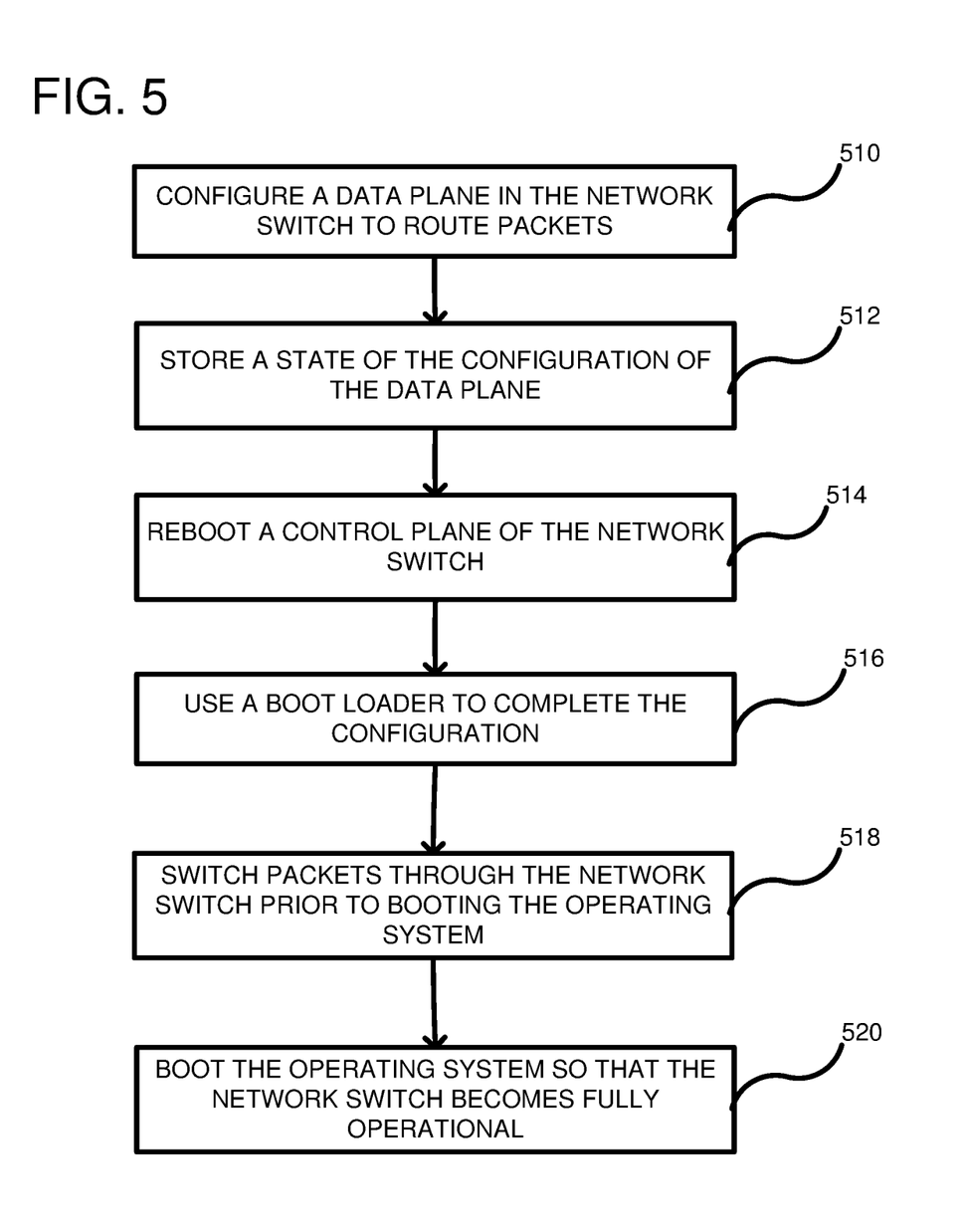
FIG. 5 is a flowchart of a method according to one embodiment for configuring a network switch after a reboot of at least part of the switch.

FIG. 5 is a flow chart of a method for rebooting of a network switch according to one embodiment. In process block 510, a data plane can be configured in a network switch to route packets through the switch. In process block 512, a state of the configuration is stored. The state information can include the state of any updates that are in process of being completed. For example, the state information can include whether a configuration update was started or completed. The state information and associated configuration information can be stored in memory within the network switch. In process block 514, a control plane within the network switch can be rebooted. Rebooting of the control plane can be rebooting of a controller within the control plane. In one example, rebooting occurs when a failure of a processor or other controller is detected and the processor or controller is restarted. During this time, the controller or processor discontinues executing the operating system until the network switch goes through a boot process. In process block 516, a boot loader is used to complete the configuration. In particular, the boot loader can retrieve the stored state information and configuration information from memory. Based on the state of any configuration updates that were interrupted due to the rebooting of the control plane, the boot loader can continue with the configuration updates of the switching logic from the point of interruption. Alternatively, the boot loader can choose to configure all of the switching logic as if this is a first power-up of the network switch. Configuration of the switching logic can require the boot loader to first boot up a communication path between the control plane and data plane, such as establishing a PCIe communication path so that it is operational. In process block 518, packets can be switched through the network switch prior to booting the operating system in the switch. Switching of the network packets includes passing the packets from the input port, through the switch logic, to the output port. In process block 520, the operating system can be booted by the boot loader so that the network switch becomes fully operational.

Figure 6:
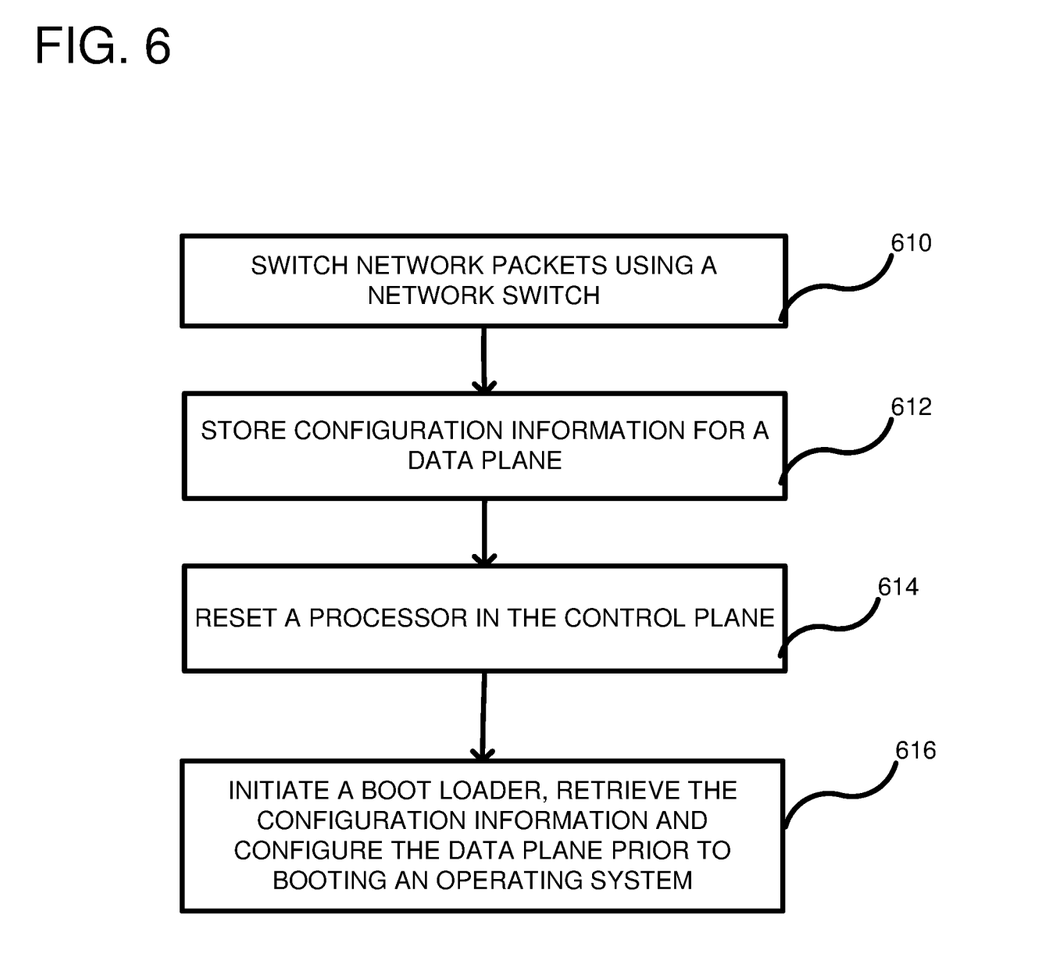
FIG. 6 is a flowchart of a method according to another embodiment for configuring a network switch.

FIG. 6 is a flow chart of a method according to another embodiment. In process block 610, network packets can be switched using a network switch. Switching of network packets means they pass from an input port and are routed to the output port of the switch for delivery to a next hop in the packets ultimate destination. In process block 612, configuration information can be stored for the data plane. Typically, the configuration information is stored in the control plane, but other storage locations can be used. The configuration information includes information to program switching logic in the network switch and can include configuration for Layer 2 hardware, Layer 3 hardware and/or ACL hardware. In process block 614, a processor in the control plane can be reset, such as a hardware reset or a software reset. Resetting of a processor typically causes the processor to start at an address 0 and execute instructions for loading and executing a boot loader application. In process block 616, a boot loader can be initiated. The boot loader can retrieve the configuration information and configure the data plane prior to booting the operating system.

Figure 7:
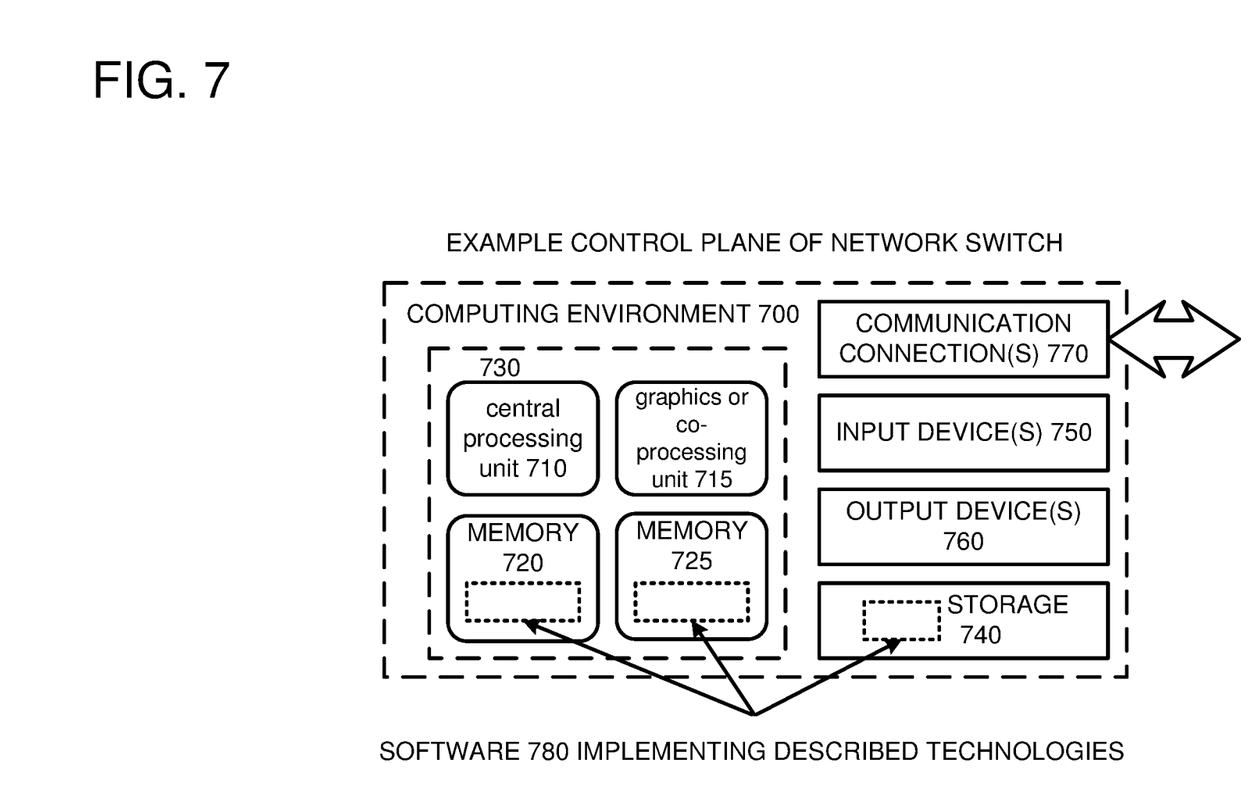
FIG. 7 depicts a generalized example of a suitable control plane for the network switch.

FIG. 7 depicts a generalized example of a suitable computing environment 700 that can be used for the control plane described herein. The computing environment 700 is not intended to suggest any limitation as to scope of use or functionality, as the innovations may be implemented in diverse general-purpose or special-purpose computing systems. With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, Flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as Flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application).

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, C, assembly language, or any other suitable programming language used in embedded systems. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of rebooting a network switch, the method comprising:
    storing, in a memory of a network switch, a state of a configuration of a switching logic used to route network packets through the network switch;
    rebooting an operating system of the network switch;
    using a boot loader stored in the memory, establishing operation of a hardware bus coupled between a processor coupled to the memory and the switching logic, retrieving the state of the configuration of the switching logic by the processor and configuring the switching logic using the boot loader, wherein the state of the configuration of the switching logic includes configuration data and state information indicating a state of any configuration updates, and transmitting the state of the configuration over the hardware bus to the switching logic;
    determining by the processor, based on the state information, configuration updates that have not been completed, and following the determination, resuming by the boot loader any of the configuration updates that have not been completed to the switching logic;
    switching packets through the switching logic prior to booting up of the operating system after the rebooting, wherein the switching of the packets includes receiving the packets on a plurality of input ports, passing the packets through layer 2 and layer 3 hardware, and outputting the packets on appropriate output ports based upon the layer 2 and layer 3 hardware decisions; and
    booting up the operating system after the configuring of the switching logic so that the network switch becomes fully operational.

2. The method of claim 1, wherein configuring of the switching logic includes updating registers in the switching logic so as to control how packets are routed through the switching logic.

3. The method of claim 1, wherein rebooting of the operating system includes detecting a failure of the processor and restarting the processor.

4. The method of claim 1, wherein storing the state of the configuration includes storing whether a configuration update was started or completed in the memory of the network switch.

5. A network switch, comprising:
    a processor;
    a memory for storing a boot loader within the network switch;
    a switching logic hardware separate from the memory and coupled between input and output ports of the network switch to route network packets through the network switch, wherein the memory further stores configuration data associated with configuration of the switching logic hardware and state information associated with a state of configuration updates to the switching logic hardware including whether the configuration updates are completed or not completed, wherein the switching logic is configured to switch packets including receiving the packets on a plurality of input ports, passing the packets through layer 2 and layer 3 hardware, and outputting the packets on appropriate output ports based upon the layer 2 and layer 3 hardware decisions; and
    a bus between the processor and the switching logic hardware;
    wherein the processor is adapted to establish communication over the bus using the boot loader to configure the switching logic so that the network packets flow through the network switch prior to an operating system boot up on the processor, and the boot loader is adapted to determine, based on the state information, configuration updates that have not been completed, and to, following the determination and prior to booting up of the operating system after the rebooting, complete the configuration updates that have not been completed.

6. The network switch of claim 5, further comprising: a communication bus between the processor and the switching logic hardware that becomes operational prior to the operating system boot up to allow the processor to configure the switching logic hardware.

7. The network switch of claim 5, wherein the memory is adapted to store a configuration journal, and wherein the processor is adapted to store a state of a configuration update in the configuration journal.

8. The network switch of claim 7, wherein the memory is a Flash memory or a Dynamic Random Access Memory (DRAM).

9. The network switch of claim 7, wherein the configuration of the switching logic hardware occurs, at least in part, using the boot loader stored in the memory, the boot loader also being for booting the operating system.

10. The network switch of claim 7, wherein the processor is configured to complete any pending configurations that occurred prior to a reboot of the processor using the configuration journal.

11. The network switch of claim 5, wherein a restarting of the processor causes the processor to configure the switching logic hardware prior to the operating system boot up.

12. A computer-readable storage medium including instructions that upon execution cause a network switch to:
switch network packets, the network switch including a controller, a memory, and a switching logic separate from the memory, wherein the switching logic includes layer 2 and layer 3 hardware for switching the packets to an appropriate output port of a plurality of output ports;
store a state of a configuration for the switching logic in the memory;
store a state of any configuration updates for the switching logic in the memory including whether the configuration updates have been completed or not completed;
reset the controller during configuration of the switching logic; and
in response to the reset, initiate a boot loader using the controller, the boot loader configured to initialize a hardware bus, retrieve the configuration information and to configure the switching logic over the hardware bus prior to booting of an operating system for the network switch, wherein the boot loader further determines, based on state of configuration updates in the memory, configuration updates that have not been completed, and following the determination and prior to booting up of the operating system after the rebooting, continues the configuration updates that have not been completed.

13. The computer-readable storage medium according to claim 12, wherein the reset is caused by a crash of the controller, a soft reboot of the controller, or a hard reboot of the controller.

14. The computer-readable storage medium of claim 12, wherein the memory is for storing the state of the configuration updates in a journal.

15. The computer-readable storage medium of claim 14, wherein the memory is a Flash memory or a Dynamic Random Access Memory (DRAM).

16. The computer-readable storage medium according to claim 12, wherein the instructions, upon execution, further cause the network switch to: switch network packets after the reset of the controller and prior to the booting up of the operating system.

17. The computer-readable storage medium according to claim 14, wherein the instructions, upon execution, further cause the network switch to: retrieve the journal from the memory, using the controller, and complete the configuration update using the state of the configuration update.

* * * * *